US010572307B2

(12) United States Patent
Suman et al.

(10) Patent No.: US 10,572,307 B2
(45) Date of Patent: Feb. 25, 2020

(54) SYSTEM AND METHOD OF TRAINING MACHINE LEARNING ALGORITHM TO SATISFACTORILY ALLOCATE RESOURCES FOR TASK EXECUTION

(71) Applicant: Bank of America Corporation, Charlotte, NC (US)

(72) Inventors: Shakti Suman, Bihar (IN); Jisoo Lee, Chesterfield, NJ (US); James McCormack, Charlotte, NC (US)

(73) Assignee: Bank of America Corportion, Charlotte, NC (US)

( * ) Notice: Subject to any disclaimer, the term of this patent is extended or adjusted under 35 U.S.C. 154(b) by 210 days.

(21) Appl. No.: 15/660,234

(22) Filed: Jul. 26, 2017

(65) Prior Publication Data
US 2019/0034227 A1    Jan. 31, 2019

(51) Int. Cl.
| | |
|---|---|
| G06F 9/48 | (2006.01) |
| G06F 9/50 | (2006.01) |
| G06N 20/00 | (2019.01) |
| G06N 7/00 | (2006.01) |

(52) U.S. Cl.
CPC .......... *G06F 9/4881* (2013.01); *G06F 9/5038* (2013.01); *G06N 7/005* (2013.01); *G06N 20/00* (2019.01)

(58) Field of Classification Search
CPC ..... G06F 9/4881; G06F 9/5038; G06N 7/005; G06N 20/00
See application file for complete search history.

(56) References Cited

U.S. PATENT DOCUMENTS

| | | |
|---|---|---|
| 8,037,187 B2 | 10/2011 | Dawson |
| 8,762,538 B2 | 6/2014 | Dutta |
| 8,799,997 B2 | 8/2014 | Spiers |
| 8,806,015 B2 | 8/2014 | Dutta |
| 8,984,610 B2 | 3/2015 | Spiers |
| 9,209,979 B2 | 12/2015 | Spiers |
| 9,413,724 B2 | 8/2016 | Xu |
| 9,450,784 B2 | 9/2016 | Schmidt |

(Continued)

FOREIGN PATENT DOCUMENTS

WO   WO2016127317 A1   8/2016

*Primary Examiner* — Meng Ai T An
*Assistant Examiner* — Michael W Ayers
(74) *Attorney, Agent, or Firm* — Baker Botts L.L.P.

(57) ABSTRACT

In one or more embodiments, one or more systems, processes, and/or methods may receive first task sets that include respective first tasks and one or more of respective first priorities, respective first minimum computing resource allocations, and respective first maximum processing times; receive first satisfaction information associated with processing the first task sets; receive first execution metric information associated with processing the first task sets; determine a first pattern based at least on the first satisfaction information and based at least on the first execution metric information; receive second task sets that include respective second tasks and one or more of respective second priorities, respective second minimum computing resource allocations, and respective second maximum processing times; determine, based at least on the first pattern, computing resources allocations for the second task sets; and determine, based at least on the first pattern, a processing order for the second task sets.

21 Claims, 9 Drawing Sheets

(56) References Cited

U.S. PATENT DOCUMENTS

| | | | |
|---|---|---|---|
| 9,584,445 B2 | 2/2017 | Stubberfield | |
| 9,635,134 B2 | 4/2017 | Cao | |
| 2003/0208521 A1* | 11/2003 | Brenner | G06F 9/4881 718/103 |
| 2008/0222640 A1* | 9/2008 | Daly | G06F 9/4881 718/103 |
| 2008/0282251 A1* | 11/2008 | Bruce | G06F 9/485 718/103 |
| 2009/0281865 A1* | 11/2009 | Stoitsev | G06Q 10/06 705/7.22 |
| 2013/0185433 A1* | 7/2013 | Zhu | H04L 67/303 709/226 |
| 2016/0085861 A1 | 3/2016 | Vecera | |
| 2018/0026904 A1* | 1/2018 | Van De Groenendaal | G06F 3/0613 709/226 |
| 2018/0365072 A1* | 12/2018 | Li | G06F 9/5038 |

\* cited by examiner

SYSTEM AND METHOD OF TRAINING MACHINE LEARNING ALGORITHM TO SATISFACTORILY ALLOCATE RESOURCES FOR TASK EXECUTION

TECHNICAL FIELD

Certain embodiments of this disclosure relate generally to executing tasks via computing resources.

BACKGROUND

Networks allow users to access various types of computing resources, which may include hardware resources and/or software resources. Examples of hardware resources include computer networks, servers, memory, and so on. Examples of software resources include applications, services, data, and so on. The computing resources may be used to process transactions. Data stores and databases can support various data types including traditional file, video, images, etc. within a name space leading to new opportunities and innovations. These data stores can have virtually unlimited storage capacity with extremely high durability and availability along with low costs leading to widespread adoption.

SUMMARY

In one or more embodiments, one or more systems, processes, and/or methods may receive first task sets that include respective first tasks and one or more of respective first priorities, respective first minimum computing resource allocations, and respective first maximum processing times and may receive first satisfaction information associated with processing the first task sets and first execution metric information associated with processing the first task sets. A first pattern based at least on the first satisfaction information and based at least on the first execution metric information may be determined. Second task sets that include respective second tasks and one or more of respective second priorities, respective second minimum computing resource allocations, and respective second maximum processing times may be received. Computing resources allocations for the second task sets may be determined based at least on the first pattern, and a processing order for the second task sets may be determined based at least on the first pattern. In one or more embodiments, the processing order and the computing resources allocations satisfy a probabilistic measure that the second task sets will be processed in accordance with the respective second priorities and in accordance with the respective second minimum computing resource allocations. For example, the probabilistic measure may be or include a conditional probabilistic measure based at least on the respective first priorities and the respective first resource allocations.

In one or more embodiments, one or more systems, processes, and/or methods may utilize machine learning in computing resources allocations and/or scheduling of tasks to be processed via computing resources. For example, the one or more systems, processes, and/or methods may utilize machine learning in determining and/or computing one or more probabilities and/or one or more models that may be utilized in optimizing computing resources allocations and/or scheduling of tasks to be processed via computing resources. In one instance, based at least on previous computing resources allocations and/or scheduling of tasks, machine learning may determine and/or compute a pattern that may be utilized in optimizing future computing resources allocations and/or scheduling of tasks to be processed via computing resources. In another instance, based at least on previous computing resources allocations and/or scheduling of tasks, machine learning may converge on a model and/or a probability that may optimize future computing resources allocations and/or scheduling of tasks to be processed via computing resources. In one or more embodiments, one or more systems, processes, and/or methods may utilize one or more conditional probabilities. For example, a conditional probability may be utilized in determining if additional resources may aid in one or more of reducing processing time of one or more tasks, increasing data processing throughput, and reducing convergence time of machine learning processes and/or methods, among others. In one or more embodiments, the conditional probability may be based at least on past data. For example, the past data may be or include past "experience" in allocating computing resources and/or processing tasks, and based at least on the past "experience", one or more predictions, utilizing the conditional probability, may be computed and/or determined. In one instance, a prediction may indicate one or more advantages of additional computing resources (e.g., additional computing capacity) in processing tasks. In another instance, a prediction may indicate one or more optimizations of additional computing resources (e.g., additional computing capacity) in processing tasks.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
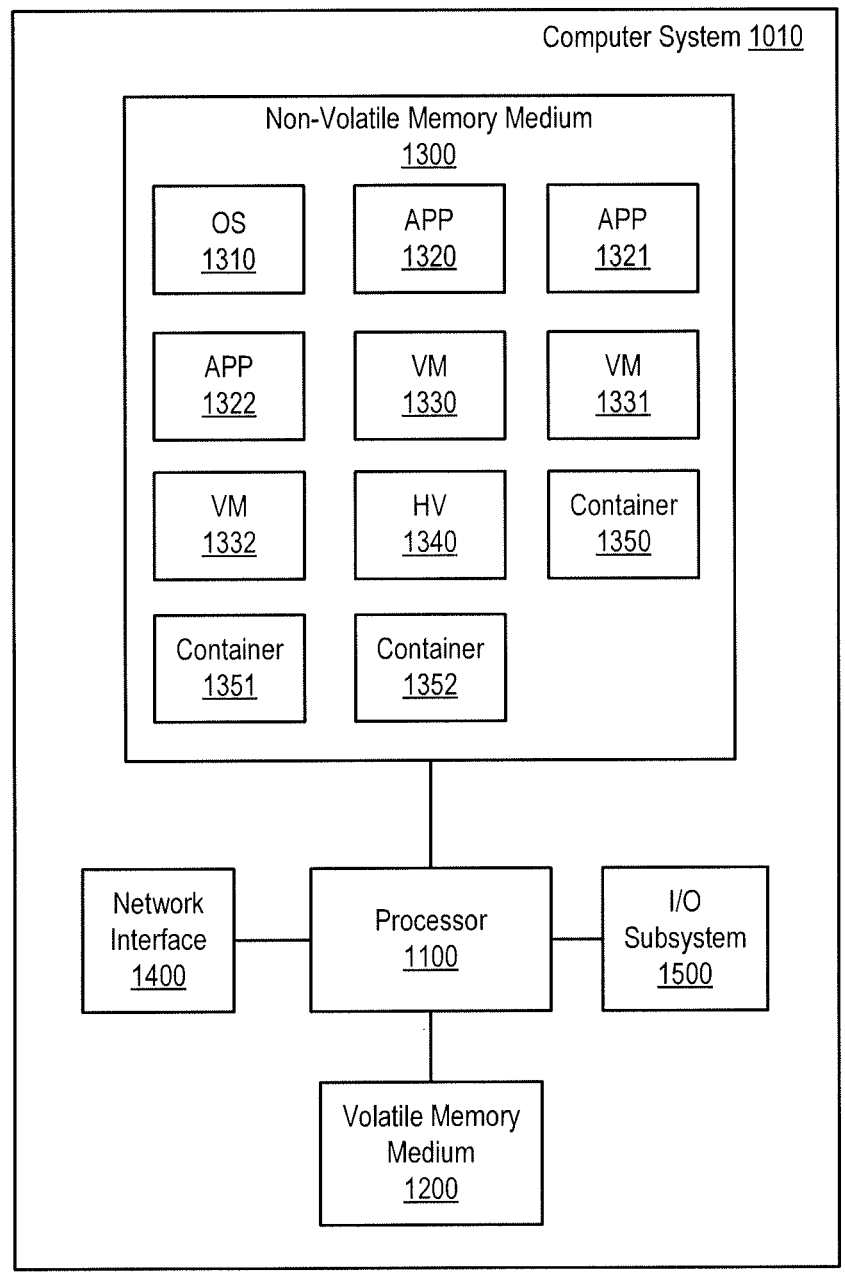
FIG. 1 illustrates an example of a computer system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, machine learning may utilize feedback information, from past executed tasks, in determining and/or computing a pattern. For example, the pattern may be utilized in converging on a model that may optimize processing one or more task sets and/or optimize utilization of computing resources. In one instance, the model that may optimize processing of task sets. In another instance, the model may optimize (e.g., minimize) idle time of computing resources. In one or more embodiments, the pattern may be utilized in prioritization and/or reprioritization of processing task sets. For example, tasks of multiple task sets may be reprioritized based at least on the pattern in processing the task sets with available computing resources. In one or more embodiments, machine learning may utilize one or more probabilistic processes and/or methods in determining and/or computing one or more patterns of a time frame and/or a pattern, which may aid in further optimizing one or more results.

In one or more embodiments, one or more systems, methods, and/or processes may determine an execution order and respective execution resource allocations based at least on a pattern of utilization and respective priorities associated with the utilization. For example, the pattern of utilization may include multiple tasks and respective associated priorities that may be executed via computing resources. For instance, an execution resource allocation and a priority may be associated with each of the multiple tasks.

In one or more embodiments, the one or more systems, methods, and/or processes may determine a probabilistic measure based at least on an additional amount of computing resources given execution metrics of previously executed tasks. For example, the probabilistic measure may be or include a conditional probabilistic measure based at least on execution metrics of previously executed tasks. In one instance, the probabilistic measure may indicate a likelihood of a reduction in an execution time for a task to be executed. In another instance, the probabilistic measure may indicate a likelihood of an increase in an amount data to be process would not affect an execution time for a task to be executed. In one or more embodiments, a probabilistic measure may indicate a likelihood in a reduction in processing time if an additional amount of computing resources are utilized. For example, the probabilistic measure may be or include a conditional probabilistic measure that may indicate a likelihood in a reduction in processing time if an additional amount of computing resources are utilized. In one or more embodiments, a computer system may suggest and/or forecast resource procurement for future needs based on machine learning and one or more past probabilistic patterns, one or more cost efficiencies, purpose-specific/specialized offering/needs. For example, the one or more past probabilistic patterns may include and/or utilize the conditional probabilistic measure based at least on execution metrics of previously executed tasks.

In one or more embodiments, the one or more systems, methods, and/or processes may receive multiple tasks and respective multiple priorities associated with the multiple tasks. For example, the multiple tasks and respective multiple priorities associated with the multiple tasks may be received from one or more computer systems. For instance, the one or more computer systems may be associated with one or more entities. In one or more embodiments, an entity may be or include one or more of a person, multiple people, a corporation, multiple corporations, a government, multiple governments, a department of a government, and multiple departments of a government, among others.

In one or more embodiments, execution data from executing each of the multiple tasks with one or more parameters may be acquired. In one example, the execution data may include a size of a task, an amount of data that the task processed, an amount of data that the task produced, and an amount of time that transpired during execution for the task, among others. In another example, the one or more parameters may include one or more of a priority, a maximum amount of time of execution, and a minimum amount of computing resources, among others. In one or more embodiments, one or more machine learning systems, methods, and/or processes may utilize the execution data in computing via a task optimizer. In one example, the execution data may be utilized as training data by the one or more machine learning systems, methods, and/or processes. In another example, the task optimizer may be utilized in determining one or more execution orders of tasks. For instance, the task optimizer may include a model (e.g., a model determine via machine learning) that may be utilized in determining the one or more execution orders of tasks.

In one or more embodiments, computing information for the task optimizer may be based at least on feedback from an entity that submitted a task for execution. For example, the feedback may include satisfaction information. For instance, the satisfaction information an indication of satisfaction or an indication of non-satisfaction. In one or more embodiments, computing information for the task optimizer may be based at least on determining a pattern based at least on the feedback and/or the execution data.

In one or more embodiments, the task optimizer may receive task sets and may determine an execution order based at least on information of the task sets. For example, a task set may include a task and one or more of a priority, input data, a minimum amount of computing resources, and a maximum amount of time to produce output data from the task, among others. In one or more embodiments, the task optimizer determining an execution order and/or one or more allocations of computing resources based at least on information of the task sets may include the task optimizer receiving information from machine learning. For example, machine learning may provide one or more systems, processes, and/or methods that provides and/or permits a computer system an ability to learn from data without being explicitly programmed and/or instructed. In one instance, machine learning may include instructions executable via one or more processors that may learn from data and make predictions via the data. In another instance, machine learning may determine one or more data-driven predictions and/or decisions via building one or more models from data (e.g., training data, execution metrics of previously executed tasks, etc.).

In one or more embodiments, machine learning may utilize feedback information in determining and/or computing a pattern. For example, determining and/or computing the pattern may be based at least on one or more of an amount of computing resources, task priority, other task sets in a task queue, available computing resources (e.g., available elements of computing resources), and the feedback information, among others. In one or more embodiments, the pattern may be utilized in converging on a model that may optimize processing one or more task sets and/or optimize utilization of computing resources. In one example, the model may optimize processing of task sets. For instance, optimizing processing of task sets may include processing the task sets at or approximate to configuration information, priority information, and/or timing information of each of the task sets. In another example, the model may optimize (e.g., minimize) idle time of computing resources. In one or more embodiments, the pattern may be utilized in prioritization and/or reprioritization of processing task sets. In one or more embodiments, machine learning may utilize one or more probabilistic processes and/or methods in determining and/or computing one or more patterns of a time frame and/or may indicate usage patterns, which may aid in further optimizing one or more results.

Turning now to FIG. 1, an example of a computer system is illustrated, according to one or more embodiments. As shown, a computer system 110 may include a processor 120, a volatile memory medium 130, a non-volatile memory medium 140, a network interface 150, and an input/output (I/O) subsystem 160. As illustrated, volatile memory medium 130, non-volatile memory medium 140, network interface 150, and input/output (I/O) subsystem 160 may be communicatively coupled to processor 120.

In one or more embodiments, one or more of volatile memory medium 130, non-volatile memory medium 140, network interface 150, and input/output (I/O) subsystem 160 may be communicatively coupled to processor 120 via one or more buses. For example, a bus may include one or more of a peripheral component interconnect (PCI) bus, a serial peripheral interface (SPI) bus, an inter-integrated circuit (I$^2$C) bus, an enhanced serial peripheral interface (eSPI) bus, a system management bus (SMBus), a universal serial bus (USB), and a low pin count (LPC) bus, among others. In one or more embodiments, one or more of volatile memory medium 130, non-volatile memory medium 140, network interface 150, and input/output (I/O) subsystem 160 may be communicatively coupled to processor 120 via one or more of a PCI-Express (PCIe) root complex and one or more PCIe switches, among others.

In one or more embodiments, the term "memory medium" may mean a "memory device", a "memory", a "storage device", a "tangible computer readable storage medium", and/or a "computer-readable medium". In one example, a memory medium may be a volatile memory medium. For instance, the volatile memory medium may lose stored data when the volatile memory medium no longer receives power. In a second example, a memory medium may be a non-volatile memory medium. For instance, the non-volatile memory medium may not lose stored data when the volatile memory medium no longer receives power or when power is not applied. In another example, a memory medium may include a volatile memory medium and a non-volatile memory medium.

In one or more embodiments, a volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others.

As shown, non-volatile memory medium 140 may include an operating system (OS) 142, applications (APPs) 144 and 145, virtual machines (VMs) 146 and 147, and a hypervisor (HV) 148. In one or more embodiments, one or more of OS 142, APPs 144 and 145, VMs 146 and 147, and HV 148 may include instructions executable by processor 120. In one example, processor 120 may execute instructions of one or more of OS 142, APPs 144 and 145, VMs 146 and 147, and HV 148 via non-volatile memory medium 140. In another example, one or more portions of the instructions of the one or more of OS 142, APPs 144 and 145, VMs 146 and 147, and HV 148 may be transferred to volatile memory medium 130, and processor 120 may execute the one or more portions of the instructions of the one or more of OS 142, APPs 144 and 145, VMs 146 and 147, and HV 148 via volatile memory medium 130.

In one or more embodiments, HV 148 may include one or more of software, firmware, and hardware that creates and executes one or more VMs (e.g., one or more of VMs 146 and 147). For example, computer system 110 may be considered host machine when HV 148 executes and one or more of VMs 146 and 147 are executed via HV 148. For instance, a virtual machine (VM) (e.g., VM 146 or 147) may be considered a guest machine. In one or more embodiments, a VM may provide one or more structures and/or functionalities as those described with reference to computer system 110 (e.g., singularly or via nesting of hypervisors and virtual machines). In one example, the VM may provide emulated devices to a guest OS that executes via the VM. In another example, the VM may provide hardware devices to the guest OS that executes via the VM. In one instance, the guest OS may access hardware in a pass-through configuration. In another instance, the guest OS may access hardware in a single root input/output virtualization (SR-IOV) configuration. In one or more embodiments, guest operating systems may share one or more devices of a host machine. For example, the guest operating systems may share one or more of a network adapter via virtual network adapters and a storage device via a virtual storage devices (e.g., virtual disks, virtual memory, etc.), among others.

In one or more embodiments, OS level virtualization may be utilized. For example, OS level virtualization may include a kernel of an OS that permits multiple isolated user space instances of collections of processes (e.g., programs, applications, services, etc.). For instance, these instances are often referred to as "containers", "software containers", "virtualization engines", or "jails" (e.g., FreeBSD jails, chroot jails, etc.). In one or more embodiments, with OS level virtualization, an OS can behave and/or appear like multiple different, individual systems. For example, little to no overhead may be imposed by OS level virtualization, as processes in OS level virtual partitions can utilize a single system call interface of an OS. For instance, OS level virtual partitions may not be subjected to emulation or be run via virtual machines. In one or more embodiments, OS level virtualization may be utilized in consolidating computer system hardware or virtual machines by moving services on separate hosts or virtual machines into containers on a computer system or single virtual machine.

Figure 2:
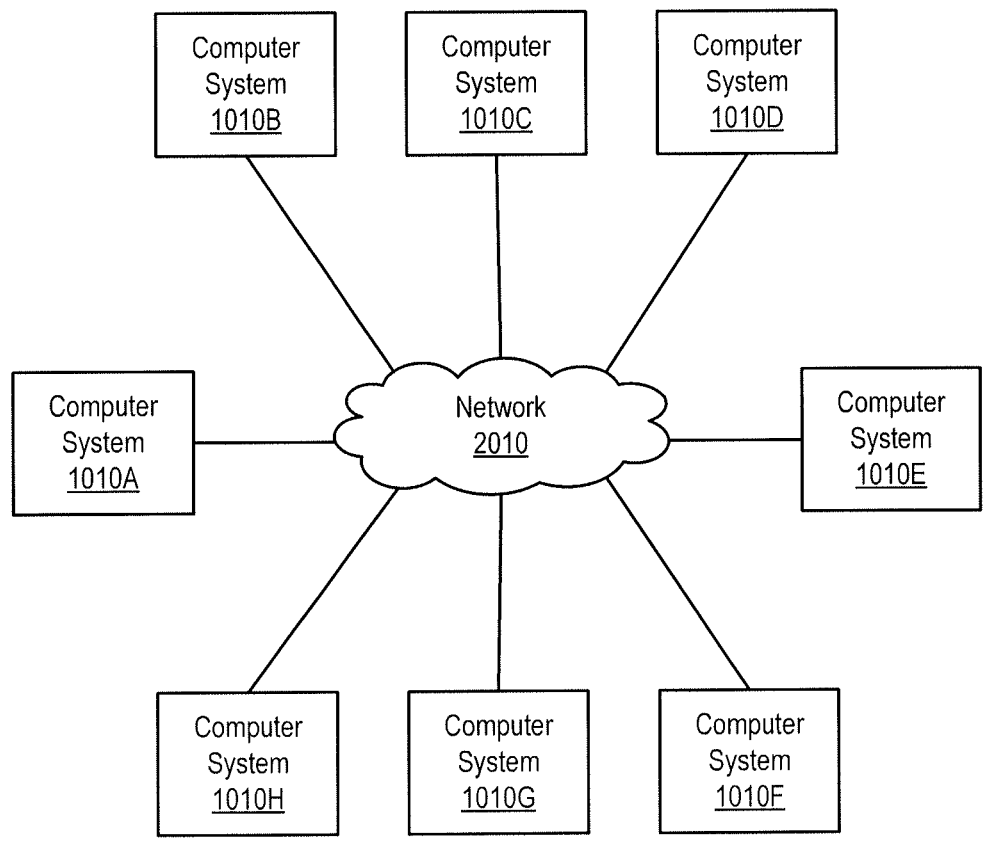
FIG. 2 illustrates an example of computer systems coupled to a network, according to one or more embodiments.

Turning now to FIG. 2, computer systems coupled to a network are illustrated, according to one or more embodiments. As shown, computer systems 1010A-1010H may be communicatively coupled to a network 2010. In one or more embodiments, network 2010 may include one or more of a wired network, an optical network, and a wireless network. For example, network 2010 may include one or more of a local area network (LAN), a wide area network (WAN), a wireless LAN (WLAN), a metropolitan area network (MAN), a public switched telephone network (PSTN), a public WAN (e.g., an Internet), a private WAN, a cellular telephone network, a satellite telephone network, and a virtual private network (VPN), among others. In one or more embodiments, network 2010 may be coupled to one or more other networks. For example, network 2010 may be coupled to one or more of a LAN, a WAN, a WLAN, a MAN, a PSTN, a public WAN, a private WAN, a cellular telephone network, a satellite telephone network, and a VPN, among others.

Figure 3:
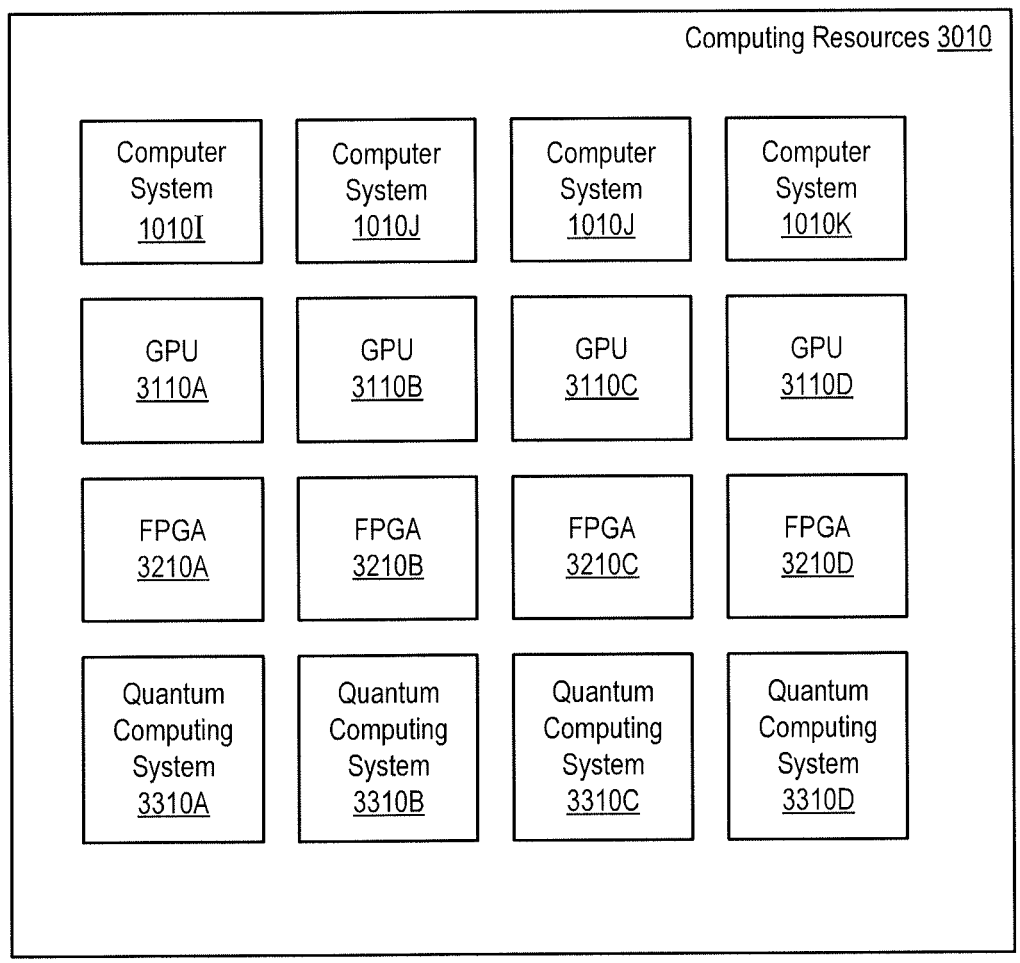
FIG. 3 illustrates an example of computing resources, according to one or more embodiments.

Turning now to FIG. 3, an example of computing resources is illustrated, according to one or more embodiments. As shown, computing resources 3010 may include computer systems 1010I-1010K, graphics processing units (GPUs) 3110A-3110D, field programmable gate arrays (FPGAs) 3210A-3210D, and quantum computing systems 3310A-3310D. In one example, graphics processing unit (GPU) 3110 may be or may include a general purpose graphics processing unit (GPGPU). In second example, field programmable gate array (FPGA) 3210 may be or may include an integrated circuit that may be configured after manufacturing the integrated circuit. In another example, quantum computing system 3310 may make direct use of quantum-mechanical phenomena (e.g., superposition, entanglement, etc.) in performing operations on data and/or processing data. For instance, quantum computing system 3310 may utilize quantum computation, which may utilize quantum bits that may be in superpositions of states. In one or more embodiments, computing resources 3010 may be configured with additional or less computational elements as those illustrated and/or may be configured with similar or different computational elements as those illustrated.

Turning now to FIGS. 4A-4D, an example of a task execution system is illustrated, according to one or more embodiments. In one or more embodiments, a computer system may submit a task set. For example, a task set may include a task and one or more of a priority, input data, a minimum amount of computing resources, and a maximum amount of time to produce output data from the task, among others. For instance, the computer system may submit a task set, such that a task of the task set may be executed in accordance with other elements of the task set. In one or more embodiments, a task may include instructions that may be utilized in generating and/or processing data. In one example, a task may include instructions that may be executed by a processor. For instance, the instructions may be executed may an element of computing resources 3010. In another example, a task may include one or more configurations. For instance, the one or more configurations may be utilized in configuring one or more elements of computing resources 3010 (e.g., one or more network elements, one or more FPGAs, one or more processors, etc.).

In one or more embodiments, computer system 1010D may receive a task set from a computer system and provide the task set to computer system 1010E. In one example, computer system 1010D may receive task sets 4210 and 4220 from computer system 1010A. In a second example, computer system 1010D may receive task sets 4230 and 4240 from computer system 1010B. In another example, computer system 1010D may receive a task set 4250 from computer system 1010C. As illustrated, computer system 1010E may store task sets 4210-4250 via a task queue 4110. In one or more embodiments, task queue 4110 may be or may include a priority queue. In one example, one or more task sets may be stored and/or retrieved via task queue 4110 based on information of the one or more task sets. In another example, one or more task sets may be stored and/or retrieved via task queue 4110 based at least on previously processing. For instance, one or more task sets may be stored and/or retrieved via task queue 4110 based at least on execution metrics of previously executed tasks.

As illustrated, computer system 1010G may include a task optimizer 4310, and computer system 4320 may include machine learning (ML) 4320. In one or more embodiments, computer system 1010 may include multiple computer systems. For example, computer system 1010F may include a cloud computing architecture that may include multiple computer systems and/or multiple virtual machines. For instance, task optimizer 4310 may include a cloud interface and/or an application programming interface (API) (e.g., a cloud API, a network API, etc.), where a cloud-based ML 4320 may interact and/or communicate with task optimizer 4310.

In one or more embodiments, ML 4320 may provide one or more systems, processes, and/or methods that provides and/or permits computer system 1010F an ability to learn from data without being explicitly programmed and/or instructed. For example, ML 4320 may include instructions executable via one or more processors that may learn from data and make predictions via the data. For instance, ML 4320 may determine one or more data-driven predictions and/or decisions via building one or more models from data (e.g., training data, execution metrics of previously executed tasks, etc.).

In one or more embodiments, task optimizer 4310 may receive input and/or configuration information from ML 4320 and allocate and/or configure computing resources 3010. For example, task optimizer 4310 may configure computing resources 3010 based at least on the input and/or the configuration information from ML 4320 and/or based at least on one or more task sets (e.g., one or more of task sets 4210-4250). In one or more embodiments, computing resources 3010 may process and/or generate data based at least on one or more configurations from task optimizer 4310 and/or based at least on one or more task sets (e.g., one or more of task sets 4210-4250). In one example, computing resources 3010 may provide output data, from processing task sets, to computer system 1010H, and computer system 1010H may provide respective the output data to respective computing systems. In another example, computing resources 3010 may provide output data to computer system 1010H, and computer system 1010H may provide the output data to one or more of computer systems 1010A-1010C. In one instance, computer system 1010H may provide output data to computer system 1010A based on one or more of task sets 4210 and 4220. In a second instance, computer system 1010H may provide output data to computer system 1010B based on one or more of task sets 4230 and 4240. In another instance, computer system 1010H may provide output data to computer system 1010C based on task set 4250.

In one or more embodiments, elements of computing resources 3010 may not be virtualized. For example, one or more elements of computing resources 3010 may be allocated to process a task set, and the one or more elements of computing resources 3010 that were allocated to process the task set may not be utilized to process another task set until the task set is processed by the one or more elements of computing resources 3010 that were allocated to process the task. For instance, two tasks may not repeatedly time share same computing resources within a time period.

Figure 4A:
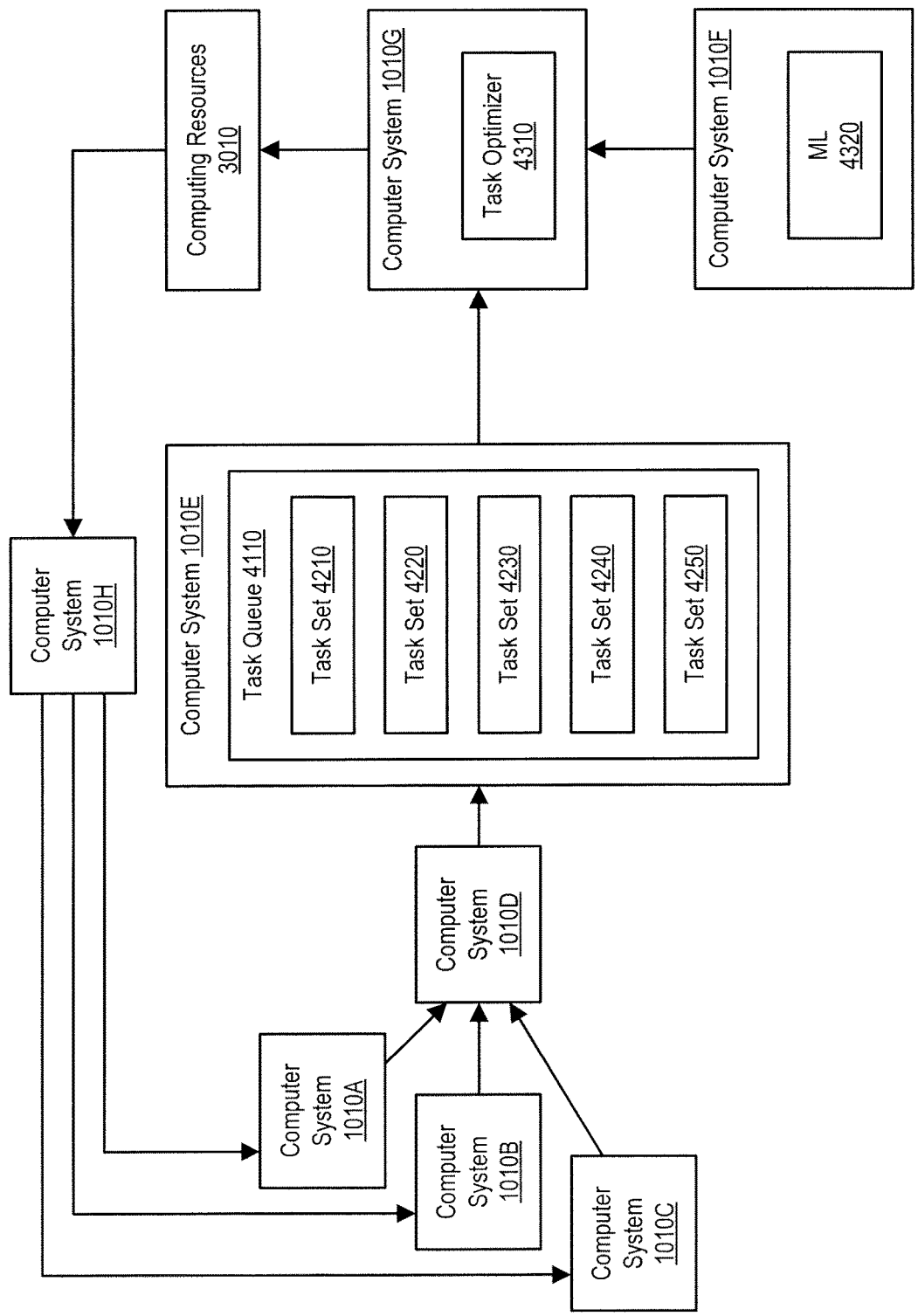
FIGS. 4A-4D illustrate an example of a task execution system, according to one or more embodiments.
Figure 4B:
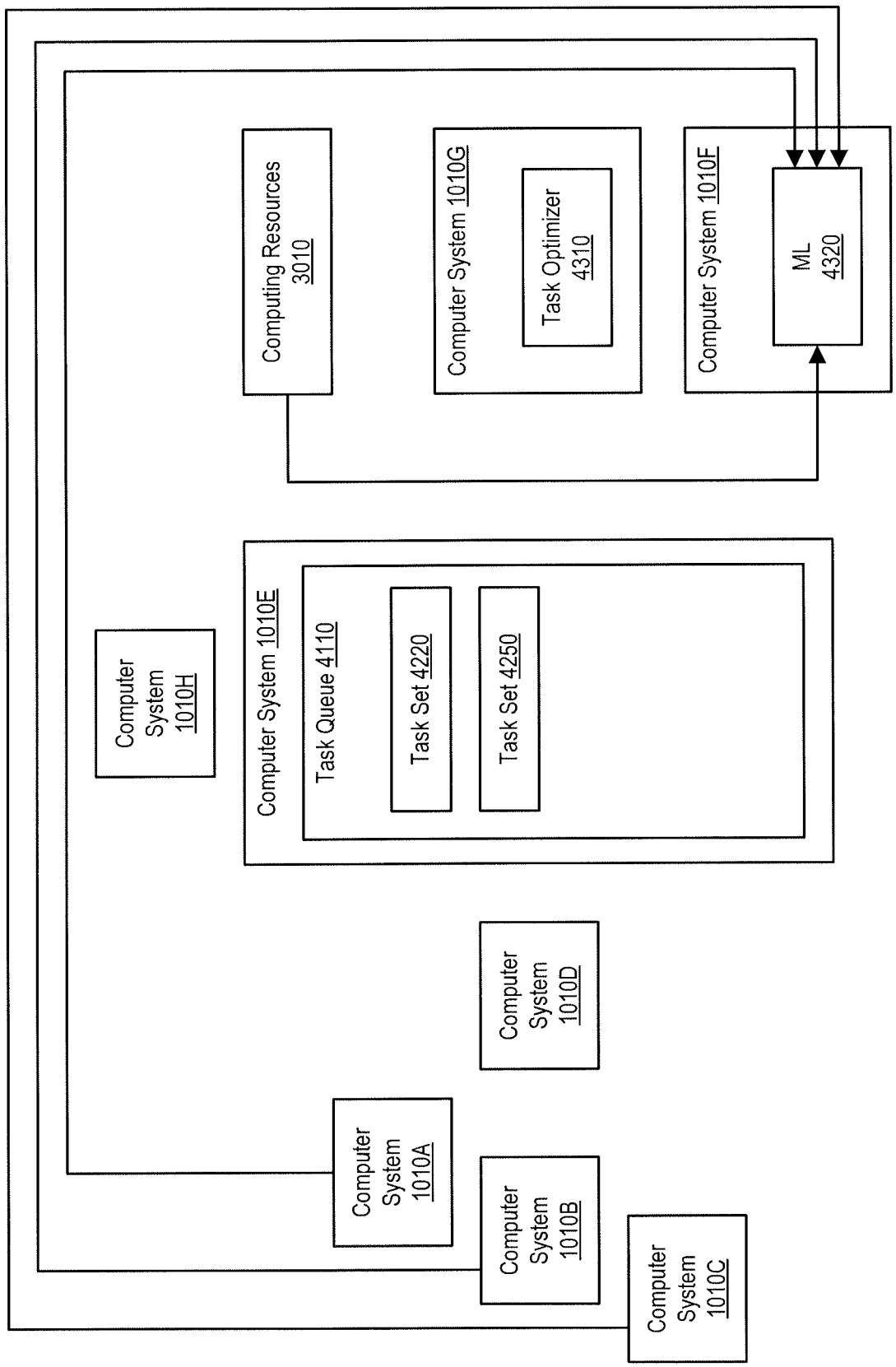

In one or more embodiments, one or more computing systems and/or computing resources may provide feedback information to ML 4320. For example, as illustrated in FIG. 4B, computer systems 1010A-1010C may provide feedback information to ML 4320, and computing resources 3010 may provide feedback information to ML 4320. In one instance, computer systems 1010A-1010C may provide respective satisfaction information (e.g., whether or not one or more task sets were satisfactorily processed). In another instance, computing resources 3010 may provide information of or based at least on execution metrics of previously executed tasks and/or processed task sets.

As illustrated, task queue 4110 may include task sets 4220 and 4250. In one example, task set 4220 may depend on data produced via task set 4210. For instance, tasks 4210 and 4220 may be interdependent and/or may be executed and/or processed in a pipeline-fashion. In another example, task optimizer 4310 may process one or more of task sets 4210, 4230, and 4240 before processing task set 4250. In one instance, task optimizer 4310 may process one or more of task sets 4210, 4230, and 4240 before processing task set 4250 based at least on information of task set 4250 (e.g., a priority, a maximum amount of time of execution, an amount of data, a minimum amount of computing resources, etc.). In another instance, task optimizer 4310 may process one or more of task sets 4210, 4230, and 4240 before processing task set 4250 based at least on machine learning logic that determined prioritization of processing task sets and/or resource allocation of computing resources 3010.

In one or more embodiments, ML 4320 may utilize feedback information in determining and/or computing a pattern. For example, determining and/or computing the pattern may be based at least on one or more of an amount of computing resources, task priority, other task sets in task queue 4110, available computing resources (e.g., available elements of computing resources 3010), and the feedback information, among others. In one or more embodiments, the pattern may be utilized in converging on a model that may optimize processing one or more task sets and/or optimize utilization of computing resources 3010. In one example, the model may optimize processing of task sets. For instance, optimizing processing of task sets may include processing the task sets at or approximate to configuration information, priority information, and/or timing information of each of the task sets. In another example, the model may optimize (e.g., minimize) idle time of computing resources 3010. In one or more embodiments, the pattern may be utilized in prioritization and/or reprioritization of processing task sets. In one or more embodiments, ML 4320 may utilize one or more probabilistic processes and/or methods in determining and/or computing one or more patterns of a time frame and/or may indicate usage patterns, which may aid in further optimizing one or more results.

Figure 4C:
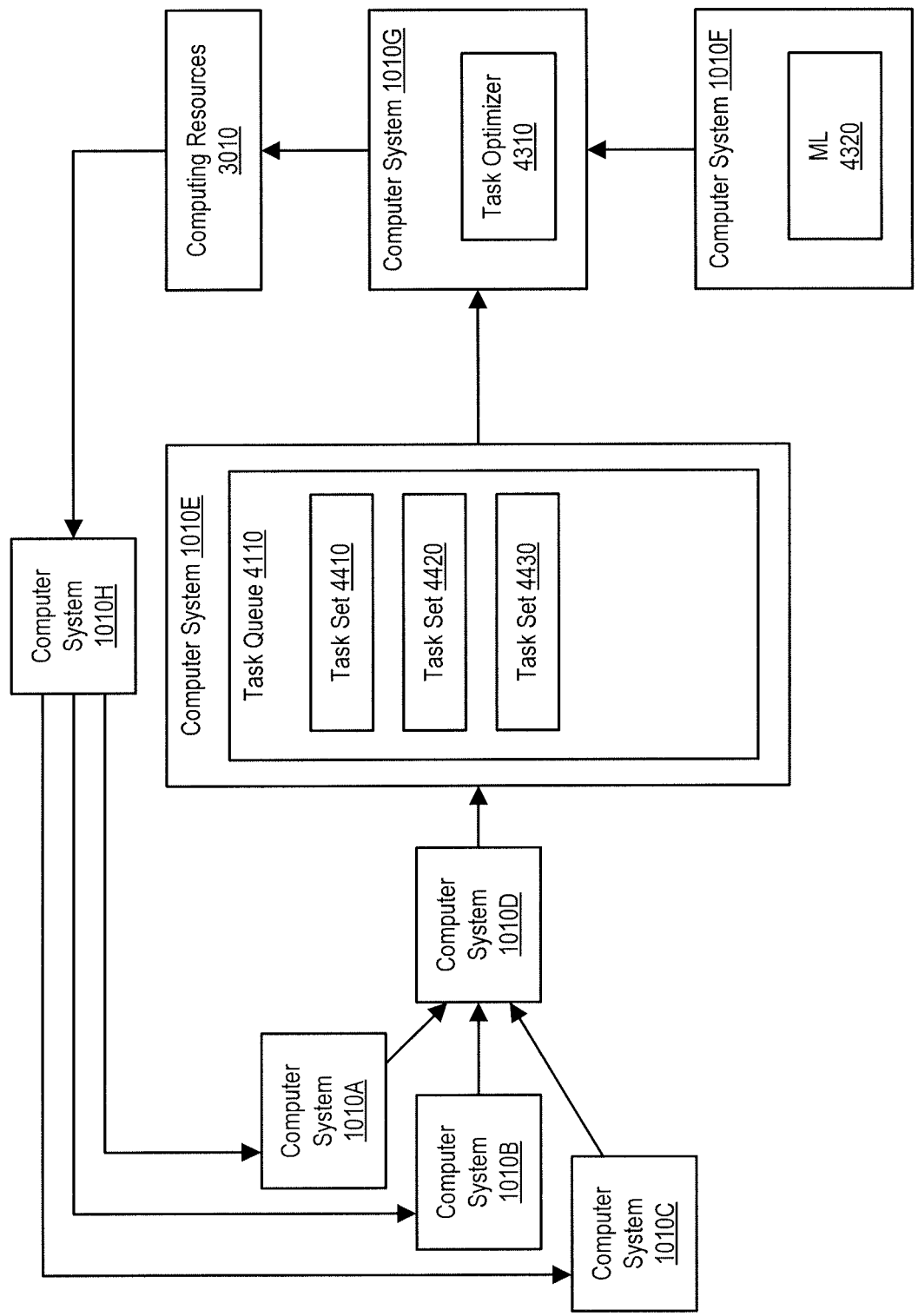

As illustrated in FIG. 4C, additional task sets may be received, according to one or more embodiments. For example, task sets 4410-4430 may be received via one or more of computer systems 1010D and 1010E. For instance, one or more of task sets 4410-4430 may be received while computing resources 3010 are processing one or more of task sets 4220 and 4250, among others.

Figure 4D:
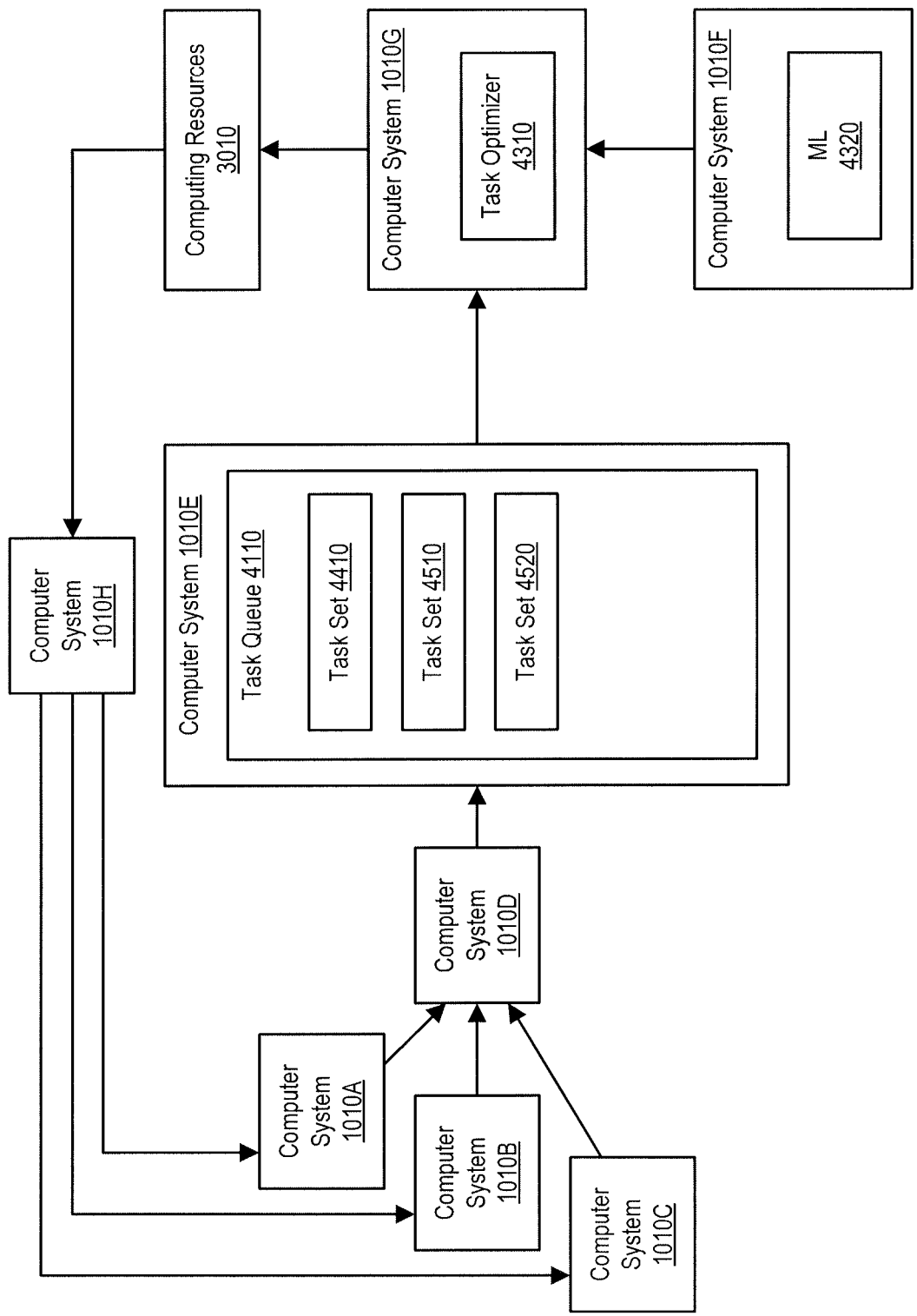

As shown in FIG. 4D, further additional task set may be received, according to one or more embodiments. For example, task sets 4510 and 4520 may be received via one or more of computer systems 1010D and 1010E. For instance, one or more of task sets 4510 and 4520 may be received while computing resources 3010 are processing one or more of task sets 4220, 4250, and 4420, among others.

In one or more embodiments, a task processing order and/or an allocation of computing resources of computing resources 3010 of two or more of tasks 4410-4430, 4510, and 4520 may satisfy a probabilistic measure. For example, the task processing order and/or the allocation of computing resources of computing resources 3010 may satisfy the probabilistic measure, where processing of two or more of task sets 4410-4430, 4510, and 4520 will be performed in accordance with respective priorities and/or in accordance with respective allocations of computing resources of computing resources 3010. In one or more embodiments, the probabilistic measure may be or include a conditional probabilistic measure. For example, the conditional probabilistic measure may based at least on execution metrics of previously executed tasks.

In one or more embodiments, ML 4320 may include instructions executable via one or more processors that may determine and/or compute the conditional probabilistic measure based at least on execution metrics of previously executed tasks. For example, ML 4320 may determine one or more data-driven predictions and/or decisions via building one or more models from data (e.g., training data, execution metrics of previously executed tasks, etc.). For instance, the one or more data-driven predictions and/or decisions may include the conditional probabilistic measure, which may be based on the one or more models.

In one or more embodiments, computing resources 3010 may be processing a task set associated with a first priority, and a request to process a task set associated with a second priority may be received. For example, the second priority may be a higher priority than the first priority. For instance, computing resources 3010 may continue to process the task set associated with the first priority, and after processing the task set associated with the first priority, computing resources 3010 may process the task set associated with the second priority (e.g., the higher priority).

In one or more embodiments, computing resources 3010 may be processing a task set associated with a first priority, and a request to process a task set associated with a second priority may be received. For example, the second priority may be a higher priority than the first priority. For instance, computing resources 3010 may pause processing of the task set associated with the first priority, may process the task set associated with the second priority after pausing the task set associated with the first priority, and may resume executing the task set associated with the first priority after processing the task set associated with the second priority.

Figure 5:
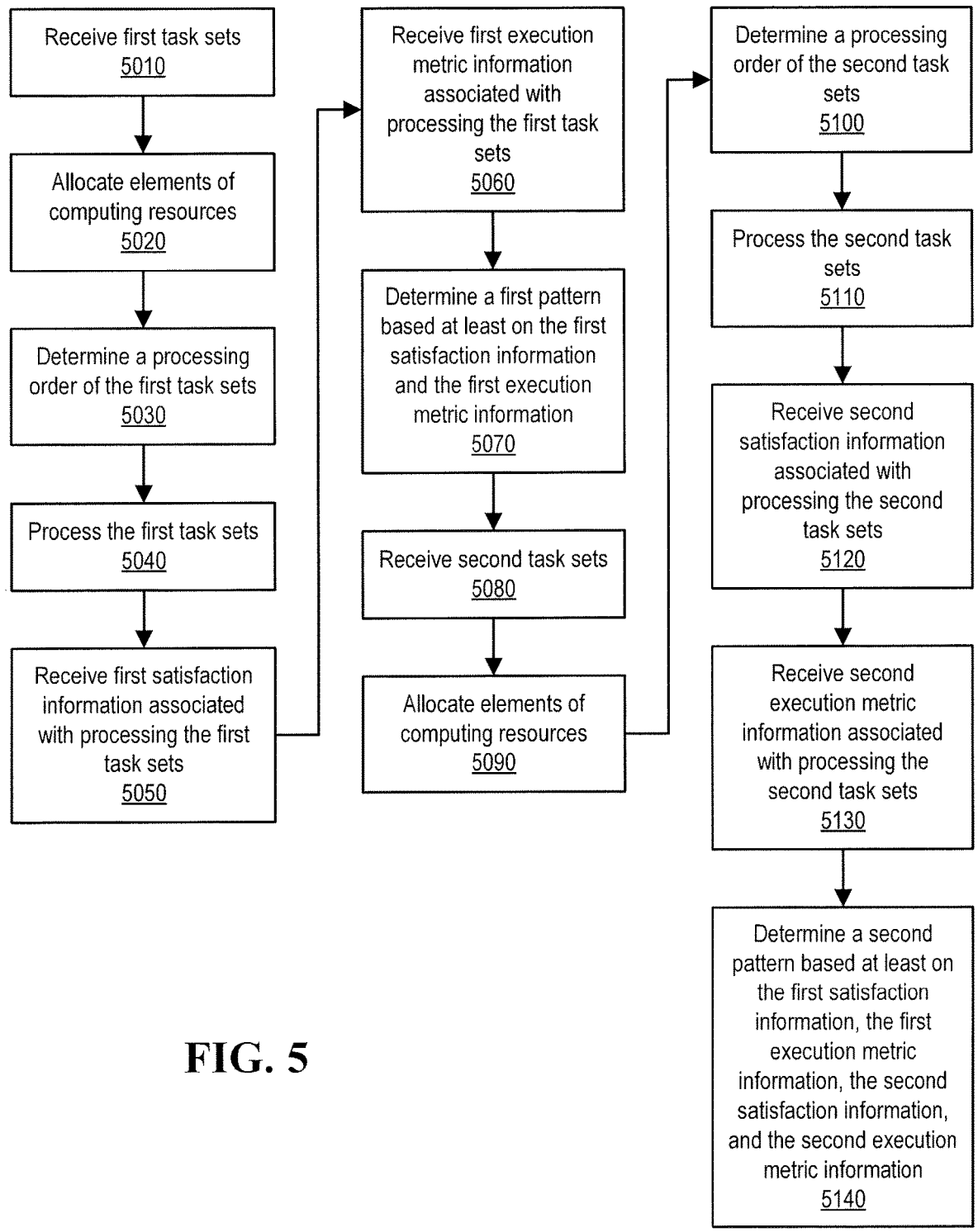
FIG. 5 illustrates an example method of executing tasks, according to one or more embodiments.

Turning now to FIG. 5, an example method of executing tasks is illustrated, according to one or more embodiments. At 5010, first task sets may be received. For example, one or more of computer systems 1010D and 1010E may receive the first task sets. For instance, one or more of computer systems 1010A-1010C may provide the first task sets. In one or more embodiments, the first task sets may be received via a network. For example, the first task sets may be received via network 2010.

At 5020, elements of computer resources may be allocated. For example, elements of computing resources 3010 may be allocated. For instance, task optimizer 4310 may allocate elements of computing resources 3010 based at least on information of the first task sets. At 5030, a processing order of the first task sets may be determined. For example, task optimizer 4310 may determine a processing order of the first task sets.

At 5040, the first task sets may be processed. For example, computing resources 3010 may process the first task sets. For instance, computing resources 3010 may process the first task sets in accordance with the processing order of the first task sets. In one or more embodiments, two or more of the first task sets may be concurrently and/or independently processed via computing resources 3010. At 5050, first satisfaction information, associated with the first task sets, may be received. For example, ML 4320 may receive first satisfaction information associated with the first task sets. In one or more embodiments, the first satisfaction information associated with the first task sets may include satisfaction information associated with processing the first task sets.

At 5060, first execution metric information, associated with the first task sets, may be received. For example, ML 4320 may receive first execution metric information associated with the first task sets. In one or more embodiments, the first execution metric information associated with the first task sets may include execution metric information associated with processing the first task sets. For example, the execution metric information may include one or more of processing times of processing the first task sets, priority information of the first task sets, elements of computing resources utilized in processing the first task sets, amounts of data processed via processing the first tasks, and amounts of data generated via processing the first task sets, among others.

At 5070, a first pattern based at least on the first satisfaction information and the first execution metric information may be determined. For example, ML 4320 may determine a first pattern based at least on the first satisfaction information and the first execution metric information. At 5080, second task sets may be received. For example, one or more of computer systems 1010D and 1010E may receive the second task sets. For instance, one or more of computer systems 1010A-1010C may provide the second task sets. In one or more embodiments, the second task sets may be received via a network. For example, the second task sets may be received via network 2010.

At 5090, elements of computer resources may be allocated. For example, elements of computing resources 3010 may be allocated. For instance, task optimizer 4310 may allocate elements of computing resources 3010 based at least on information of the second task sets. In one or more embodiments, task optimizer 4310 may allocate elements of computing resources 3010 based at least on the first pattern. For example, a probabilistic measure may be based at least on the first pattern, and the allocation of elements of computing resources 3010 of the second task sets may satisfy a probabilistic measure that the second task sets will utilize in accordance with one or more of respective second priorities, respective second minimum computing resource allocations, and respective second maximum processing times, among others. In one or more embodiments, the probabilistic measure may be or may include a conditional probabilistic measure.

At 5100, a processing order of the second task sets may be determined. For example, task optimizer 4310 may determine a processing order of the second task sets. In one or more embodiments, task optimizer 4310 may determine a processing order of the second task sets based on the first pattern. For example, a probabilistic measure may be based at least on the first pattern, and the processing order of the second task sets may satisfy a probabilistic measure that the second task sets will be processed in accordance with one or more of respective second priorities, respective second minimum computing resource allocations, and respective second maximum processing times, among others. In one or more embodiments, the probabilistic measure may be or may include a conditional probabilistic measure. In one example, the conditional probabilistic measure may be based at least on allocated elements of computer resources 3010. In another example, the conditional probabilistic measure may be based at least on the first priorities and the first computing resource allocations.

In one or more embodiments, the processing order of the second task sets may utilize one or more different priorities than respective priorities of the second task sets. For example, the respective priorities of the second task sets may be altered in satisfying the probabilistic measure. For instance, in satisfying the probabilistic measure, task optimizer 4310 may alter the respective priorities of the second task sets in accordance with the probabilistic measure such that the respective priorities of the second task sets are likely (e.g., probabilistically) to be satisfied in processing the second task sets.

At 5110, the second task sets may be processed. For example, computing resources 3010 may process the second task sets. For instance, computing resources 3010 may process the second task sets in accordance with the processing order of the second task sets. In one or more embodiments, two or more of the second task sets may be concurrently and/or independently processed via computing resources 3010. At 5120, second satisfaction information, associated with the second task sets, may be received. For example, ML 4320 may receive second satisfaction information associated with the second task sets. In one or more embodiments, the second satisfaction information associated with the second task sets may include satisfaction information associated with processing the second task sets.

At 5130, second execution metric information, associated with the second task sets, may be received. For example, ML 4320 may receive second execution metric information associated with the second task sets. In one or more embodiments, the second execution metric information associated with the second task sets may include execution metric information associated with processing the second task sets. For example, the execution metric information may include one or more of processing times of processing the second task sets, priority information of the second task sets, reprioritization information of the second task sets, elements of computing resources utilized in processing the second task sets, amounts of data processed via processing the second tasks, and amounts of data generated via processing the second task sets, among others.

At 5140, a second pattern based at least on the second satisfaction information, the first execution metric information, the second satisfaction information, and the second execution metric information may be determined. For example, ML 4320 may determine a second pattern based at least on the first satisfaction information, the first execution metric information, the second satisfaction information, and the second execution metric information. In one or more embodiments, the second pattern may be utilized in processing additional task sets.

Figure 6:
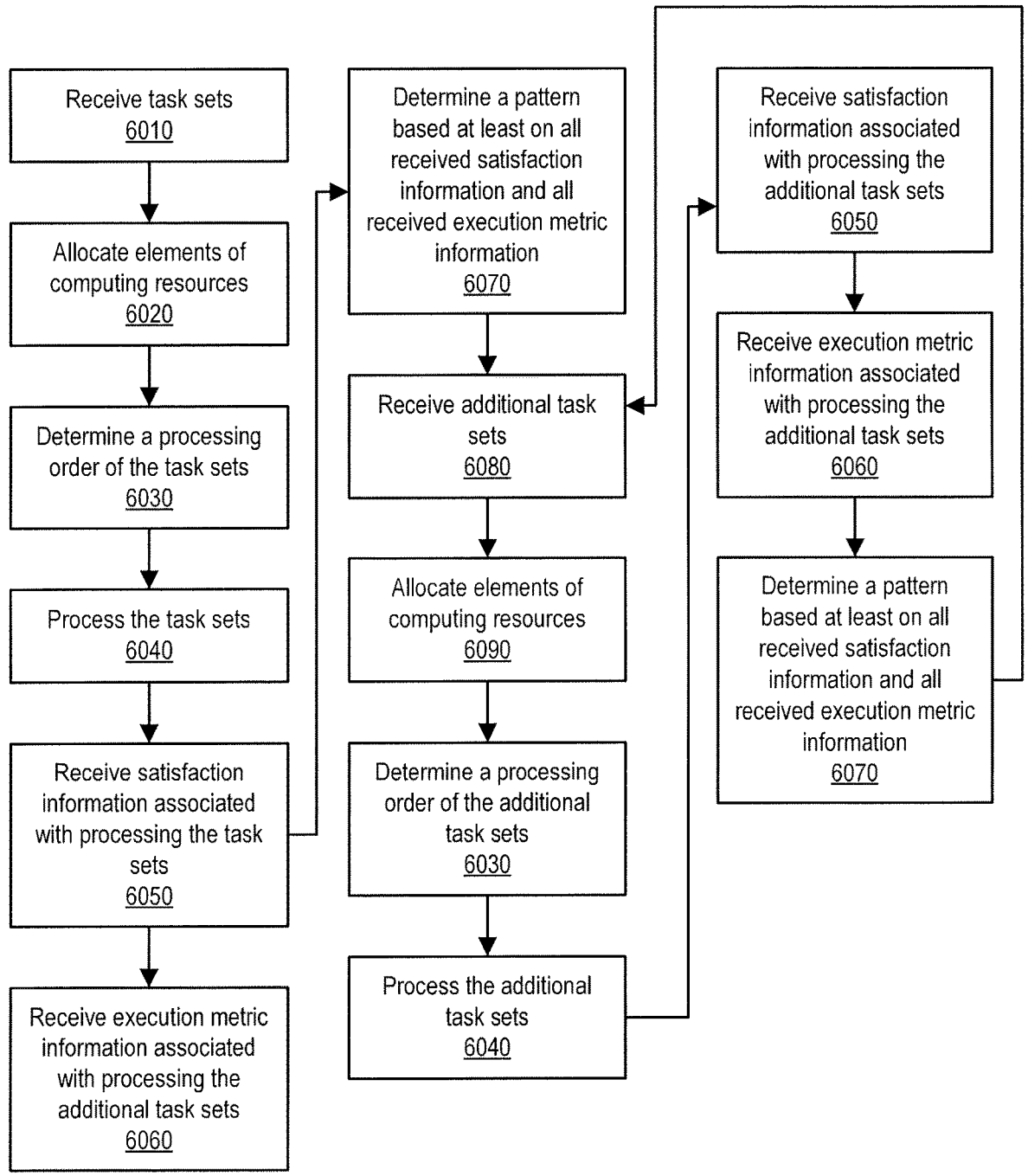
FIG. 6 illustrates another example method of executing tasks, according to one or more embodiments.

Turning now to FIG. 6, another example method of executing tasks is illustrated, according to one or more embodiments. At 6010, task sets may be received. For example, one or more of computer systems 1010D and 1010E may receive the task sets. For instance, one or more of computer systems 1010A-1010C may provide the task sets. In one or more embodiments, the task sets may be received via a network. For example, the task sets may be received via network 2010.

At 6020, elements of computer resources may be allocated. For example, elements of computing resources 3010 may be allocated. For instance, task optimizer 4310 may allocate elements of computing resources 3010 based on information of the task sets. At 6030, a processing order of the task sets may be determined. For example, task optimizer 4310 may determine a processing order of the task sets. At 6040, the task sets may be processed. For example, computing resources 3010 may process the task sets. For instance, computing resources 3010 may process the task sets in accordance with the processing order of the task sets.

At 6050, satisfaction information, associated with the task sets, may be received. For example, ML 4320 may receive satisfaction information associated with the task sets. In one or more embodiments, the satisfaction information associated with the task sets may include satisfaction information associated with processing the task sets. At 6060, execution metric information, associated with the task sets, may be received. For example, ML 4320 may receive execution metric information associated with the task sets. In one or more embodiments, the execution metric information associated with the task sets may include execution metric information associated with processing the task sets. For example, the execution metric information may include one or more of processing times of processing the task sets, priority information of the task sets, elements of computing resources utilized in processing the task sets, amounts of data processed via processing the tasks, and amounts of data generated via processing the task sets, among others.

At 6070, a pattern based at least on the satisfaction information and the execution metric information may be determined. For example, ML 4320 may determine a pattern based at least on the satisfaction information and the execution metric information. At 6080, additional task sets may be received. For example, one or more of computer systems 1010D and 1010E may receive the additional task sets. For instance, one or more of computer systems 1010A-1010C may provide the additional task sets. In one or more embodiments, the additional task sets may be received via a network. For example, the additional task sets may be received via network 2010.

At 6090, elements of computer resources may be allocated. For example, elements of computing resources 3010 may be allocated. For instance, task optimizer 4310 may allocate elements of computing resources 3010 based at least on information of the additional task sets. In one or more embodiments, task optimizer 4310 may allocate elements of computing resources 3010 based at least on a pattern. In one example, task optimizer 4310 may allocate elements of computing resources 3010 based at least on the pattern determined at 6070. In another example, task optimizer 4310 may allocate elements of computing resources 3010 based at least on a latest determined pattern.

At 6100, a processing order of the additional task sets may be determined. For example, task optimizer 4310 may determine a processing order of the additional task sets. In one or more embodiments, task optimizer 4310 may determine a processing order of the additional task sets based at least on a pattern. In one example, task optimizer 4310 may determine a processing order of the additional task sets based at least on the pattern determined at 6070. In another example, task optimizer 4310 may determine a processing order of the additional task sets based at least on a latest determined pattern.

In one or more embodiments, the processing order of the second task sets may utilize one or more different priorities than respective priorities of the second task sets. For example, the respective priorities of the additional task sets may be altered in satisfying the probabilistic measure. For instance, in satisfying the probabilistic measure, task optimizer 4310 may alter the respective priorities of the additional task sets in accordance with the probabilistic measure such that the respective priorities of the additional task sets are likely (e.g., probabilistically) to be satisfied in processing the additional task sets.

At 6110, the additional task sets may be processed. For example, computing resources 3010 may process the additional task sets. For instance, computing resources 3010 may process the additional task sets in accordance with the processing order of the additional task sets. In one or more embodiments, two or more of the additional task sets may be concurrently and/or independently processed via computing resources 3010.

At 6120, additional satisfaction information, associated with the additional task sets, may be received. For example, ML 4320 may receive additional satisfaction information associated with the additional task sets. In one or more embodiments, the additional satisfaction information associated with the additional task sets may include satisfaction information associated with processing the additional task sets.

At 6130, additional execution metric information, associated with the additional task sets, may be received. For example, ML 4320 may receive additional execution metric information associated with the additional task sets. In one or more embodiments, the additional execution metric information associated with the additional task sets may include execution metric information associated with processing the additional task sets. For example, the execution metric information may include one or more of processing times of processing the additional task sets, priority information of the additional task sets, elements of computing resources utilized in processing the additional task sets, amounts of data processed via processing the additional tasks, and amounts of data generated via processing the additional task sets, among others.

At 6140, an additional pattern based at least on the additional satisfaction information and the additional execution metric information may be determined. For example, ML 4320 may determine an additional pattern based at least on the additional satisfaction information and the additional execution metric information. In one or more embodiments, the method may proceed to 6080.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
one or more processors;
a memory medium communicatively coupled to the one or more processors;
wherein the memory medium stores instructions that are executable by the one or more processors and that when executed by the one or more processors, cause the system to:
  receive a first plurality of task sets, comprising a first task set, a second task set, and a third task set, the first task set comprising a first plurality of tasks and first requirements comprising a first plurality of priorities between the first plurality of tasks, a first plurality of minimum computing resource allocation amounts for processing the first plurality of tasks, and a first plurality of maximum processing times to produce output data from the first plurality of tasks, the second task set comprising a second plurality of tasks and second requirements comprising a second plurality of priorities between the second plurality of tasks, a second plurality of minimum computing resource allocation amounts for processing the second plurality of tasks, and a second plurality of maximum processing times to produce output data from the second plurality of tasks, and the third task set comprising a third plurality of tasks and third requirements comprising a third plurality of priorities between the second plurality of tasks, a third plurality of minimum computing resource allocation amounts for processing the third plurality of tasks, and a third plurality of maximum processing times to produce output from the third plurality of tasks;
  allocate the first task set and the second task set to a first element of computing resources of a plurality of elements of computing resources, wherein the first element of computing resources has a first particular amount of computing resources and is configured to process the first task set before processing the second task set;
  allocate the third task set to a second element of computing resources, wherein the second element of computing resources has a second particular amount of computing resources and is configured to process the third task set;
  in response to processing the first, second, and third task sets by the first and second elements, receive information comprising:
    first information associated with processing the first task set, the first information received from a first computer system that submitted the first task set, in response to the first element processing the first task set, the first information indicating that the processing of the first task set was performed satisfactorily, the first information indicating that the first task set was processed in accordance with the first requirements;
    second information associated with processing the second task set, the second information received from a second computer system that submitted the second task set, in response to the first element processing the second task set, the second information indicating that the processing of the second task set was performed unsatisfactorily, the second information indicating that the second task set was not processed in accordance with the second requirements; and
    third information associated with processing the third task set, the third information received from a third computer system that submitted the third task set, in response to the second element processing the third task set, the third information indicating that the processing of the third task set was performed satisfactorily, the third information indicating that the third task set was processed in accordance with the third requirements;
  receive first execution metric information associated with processing the first plurality of task sets, the first execution metric information comprising, for each task of the first, second, and third plurality of tasks of the first plurality of task sets, a size of the task, an amount of data that the task processed, an amount of data that the task produced, and an amount of time that transpired during execution for the task;
  train a machine learning algorithm based at least on the information and based at least on the first execution metric information, wherein the machine learning algorithm is configured to determine an order for processing a plurality of future task sets submitted by a plurality of computer systems and to allocate the plurality of future task sets to the plurality of elements of computing resources, to minimize an amount of idle time of the plurality of elements of computing resources and to maximize an amount of information indicating satisfaction with an execution of the plurality of future task sets, received from the plurality of computer systems that submitted the plurality of future task sets in response to processing the plurality of future task sets;
  subsequently receive a second plurality of task sets, comprising a fourth task set, a fifth task set, and a sixth task set, the fourth task set comprising a fourth plurality of tasks and fourth requirements comprising a fourth plurality of priorities between the fourth plurality of tasks, a fourth plurality of minimum computing resource allocation amounts for processing the fourth plurality of tasks, and a fourth plurality of maximum processing times to produce output data from the fourth plurality of tasks, the fifth task set comprising a fifth plurality of tasks and fifth requirements comprising a fifth plurality of priorities between the fifth plurality of tasks, a fifth plurality of minimum computing resource allocation amounts for processing the fifth plurality of tasks, and a fifth plurality of maximum processing times to produce output data from the fifth plurality of tasks, and the sixth task set comprising a sixth plurality of tasks and sixth requirements comprising a sixth plurality of priorities between the sixth plurality of tasks, a sixth plurality of minimum computing resource allocation amounts for processing the sixth plurality of tasks, and a sixth plurality of maximum processing times to produce output data from the sixth plurality of tasks;
  determine, based at least on the machine learning algorithm, allocations for the second plurality of task sets to the plurality of elements of computing resources, and a processing order for the second plurality of task sets, wherein the allocations and processing order satisfy a probabilistic measure that the fourth, fifth, and sixth task sets will be processed in accordance with the fourth, fifth, and sixth requirements, respectively;

and
process the second plurality of task sets according to the determined allocations and the determined processing order.

2. The system of claim 1, wherein the plurality of elements of computing resources comprise graphics processing units.

3. The system of claim 1, wherein the plurality of elements of computing resources comprise field programmable gate arrays.

4. The system of claim 1, wherein the memory medium comprises at least one of an operating system, a virtual machine, and a hypervisor.

5. The system of claim 1, wherein the memory medium further stores instructions that are executable by the one or more processors and that when executed by the one or more processors, cause the system to further:
receive a request to process a seventh task set while the system is processing at least one of the fourth task set, the fifth task set, and the sixth task set, wherein the fourth task set is associated with a first priority, the fifth task set is associated with a second priority, the sixth task set is associated with a third priority, and the seventh task set is associated with a fourth priority that is a higher priority than the first priority, the second priority, and the third priority;
determine that the system has finished processing the fourth task set, the fifth task set, and the sixth task set; and
in response to determining that the system has finished processing the fourth task set, the fifth task set, and the sixth task set, process the seventh task set.

6. The system of claim 1, wherein the memory medium further stores instructions that are executable by the one or more processors and that when executed by the one or more processors, cause the system to further:
receive a request to process a seventh task set while the system is processing at least one of the fourth task set, the fifth task set, and the sixth task set, wherein the fourth task set is associated with a first priority, the fifth task set is associated with a second priority, the sixth task set is associated with a third priority, and the seventh task set is associated with a fourth priority that is a higher priority than the first priority, the second priority, and the third priority;
pause processing the at least one of the fourth task set, the fifth task set, and the sixth task set;
after the system pauses processing the at least one of the fourth task set, the fifth task set, and the sixth task set, process the seventh task set; and
after the system processes the seventh task set, resume processing the at least one of the fourth task set, the fifth task set, and the sixth task set.

7. The system of claim 1, wherein multiple of the second plurality of tasks are interdependent and are executed in a pipeline-fashion.

8. A method, comprising:
receiving a first plurality of task sets, comprising a first task set, a second task set, and a third task set, the first task set comprising a first plurality of tasks and first requirements comprising a first plurality of priorities between the first plurality of tasks, a first plurality of minimum computing resource allocation amounts for processing the first plurality of tasks, and a first plurality of maximum processing times to produce output data from the first plurality of tasks, the second task set comprising a second plurality of tasks and second requirements comprising a second plurality of priorities between the second plurality of tasks, a second plurality of minimum computing resource allocation amounts for processing the second plurality of tasks, and a second plurality of maximum processing times to produce output data from the second plurality of tasks, and the third task set comprising a third plurality of tasks and third requirements comprising a third plurality of priorities between the second plurality of tasks, a third plurality of minimum computing resource allocation amounts for processing the third plurality of tasks, and a third plurality of maximum processing times to produce output from the third plurality of tasks;
allocating the first task set and the second task set to a first element of computing resources of a plurality of elements of computing resources, wherein the first element of computing resources has a first particular amount of computing resources and is configured to process the first task set before processing the second task set;
allocating the third task set to a second element of computing resources, wherein the second element of computing resources has a second particular amount of computing resources and is configured to process the third task set;
in response to processing the first, second, and third task sets by the first and second elements, receiving information comprising:
first information associated with processing the first task set, the first information received from a first computer system that submitted the first task set, in response to the first element processing the first task set, the first information indicating that the processing of the first task set was performed satisfactorily, the first information indicating that the first task set was processed in accordance with the first requirements;
second information associated with processing the second task set, the second information received from a second computer system that submitted the second task set, in response to the first element processing the second task set, the second information indicating that the processing of the second task set was performed unsatisfactorily, the second information indicating that the second task set was not processed in accordance with the second requirements; and
third information associated with processing the third task set, the third information received from a third computer system that submitted the third task set, in response to the second element processing the third task set, the third information indicating that the processing of the third task set was performed satisfactorily, the third information indicating that the third task set was processed in accordance with the third requirements;
receiving first execution metric information associated with processing the first plurality of task sets, the first execution metric information comprising, for each task of the first, second, and third plurality of tasks of the first plurality of task sets, a size of the task, an amount of data that the task processed, an amount of data that the task produced, and an amount of time that transpired during execution for the task;
training a machine learning algorithm based at least on the information and based at least on the first execution metric information, wherein the machine learning algorithm is configured to determine an order for processing a plurality of future task sets submitted by a plurality of computer systems and to allocate the plurality of future task sets to the plurality of elements of computing resources, to minimize an amount of idle time of the plurality of elements of computing resources and to maximize an amount of information indicating satisfaction with an execution of the plurality of future task sets, received from the plurality of computer systems that submitted the plurality of future task sets in response to processing the plurality of future task sets;

subsequently receiving a second plurality of task sets, comprising a fourth task set, a fifth task set, and a sixth task set, the fourth task set comprising a fourth plurality of tasks and fourth requirements comprising a fourth plurality of priorities between the fourth plurality of tasks, a fourth plurality of minimum computing resource allocation amounts for processing the fourth plurality of tasks, and a fourth plurality of maximum processing times to produce output data from the fourth plurality of tasks, the fifth task set comprising a fifth plurality of tasks and fifth requirements comprising a fifth plurality of priorities between the fifth plurality of tasks, a fifth plurality of minimum computing resource allocation amounts for processing the fifth plurality of tasks, and a fifth plurality of maximum processing times to produce output data from the fifth plurality of tasks, and the sixth task set comprising a sixth plurality of tasks and sixth requirements comprising a sixth plurality of priorities between the sixth plurality of tasks, a sixth plurality of minimum computing resource allocation amounts for processing the sixth plurality of tasks, and a sixth plurality of maximum processing times to produce output data from the sixth plurality of tasks;

determining, based at least on the machine learning algorithm, allocations for the second plurality of task sets to the plurality of elements of computing resources, and a processing order for the second plurality of task sets, wherein the allocations and processing order satisfy a probabilistic measure that the fourth, fifth, and sixth task sets will be processed in accordance with the fourth, fifth, and sixth requirements, respectively; and processing the second plurality of task sets according to the determined allocations and the determined processing order.

9. The method of claim 8, wherein the plurality of elements of computing resources comprise graphics processing units.

10. The method of claim 8, wherein the plurality of elements of computing resources comprise field programmable gate arrays.

11. The method of claim 8, wherein the memory medium comprises at least one of an operating system, a virtual machine, and a hypervisor.

12. The method of claim 8, further comprising:
receiving a request to process a seventh task set while the system is processing at least one of the fourth task set, the fifth task set, and the sixth task set, wherein the fourth task set is associated with a first priority, the fifth task set is associated with a second priority, the sixth task set is associated with a third priority, and the seventh task set is associated with a fourth priority that is a higher priority than the first priority, the second priority, and the third priority;

determining that the system has finished processing the fourth task set, the fifth task set, and the sixth task set; and in response to determining that the system has finished processing the fourth task set, the fifth task set, and the sixth task set, processing the seventh task set.

13. The method of claim 8, further comprising:
receiving a request to process a seventh task set while the system is processing at least one of the fourth task set, the fifth task set, and the sixth task set, wherein the fourth task set is associated with a first priority, the fifth task set is associated with a second priority, the sixth task set is associated with a third priority, and the seventh task set is associated with a fourth priority that is a higher priority than the first priority, the second priority, and the third priority;

pausing the processing the at least one of the fourth task set, the fifth task set, and the sixth task set;

after the pausing the processing the at least one of the fourth task set, the fifth task set, and the sixth task set, processing the seventh task set; and after the processing the seventh task set, resuming the processing the at least one of the fourth task set, the fifth task set, and the sixth task set.

14. The method of claim 8, wherein multiple of the second plurality of tasks are interdependent and are executed in a pipeline-fashion.

15. A computer-readable non-transient memory medium that comprises instructions executable by one or more processors of a system, wherein when the one or more processors executes the instructions, the instruction cause the system to:

receive a first plurality of task sets, comprising a first task set, a second task set, and a third task set, the first task set comprising a first plurality of tasks and first requirements comprising a first plurality of priorities between the first plurality of tasks, a first plurality of minimum computing resource allocation amounts for processing the first plurality of tasks, and a first plurality of maximum processing times to produce output data from the first plurality of tasks, the second task set comprising a second plurality of tasks and second requirements comprising a second plurality of priorities between the second plurality of tasks, a second plurality of minimum computing resource allocation amounts for processing the second plurality of tasks, and a second plurality of maximum processing times to produce output data from the second plurality of tasks, and the third task set comprising a third plurality of tasks and third requirements comprising a third plurality of priorities between the second plurality of tasks, a third plurality of minimum computing resource allocation amounts for processing the third plurality of tasks, and a third plurality of maximum processing times to produce output from the third plurality of tasks;

allocate the first task set and the second task set to a first element of computing resources of a plurality of elements of computing resources, wherein the first element of computing resources has a first particular amount of computing resources and is configured to process the first task set before processing the second task set;

allocate the third task set to a second element of computing resources, wherein the second element of computing resources has a second particular amount of computing resources and is configured to process the third task set;

in response to processing the first, second, and third task sets by the first and second elements, receive information comprising:
: first information associated with processing the first task set, the first information received from a first computer system that submitted the first task set, in response to the first element processing the first task set, the first information indicating that the processing of the first task set was performed satisfactorily, the first information indicating that the first task set was processed in accordance with the first requirements;
: second information associated with processing the second task set, the second information received from a second computer system that submitted the second task set, in response to the first element processing the second task set, the second information indicating that the processing of the second task set was performed unsatisfactorily, the second information indicating that the second task set was not processed in accordance with the second requirements; and
: third information associated with processing the third task set, the third information received from a third computer system that submitted the third task set, in response to the second element processing the third task set, the third information indicating that the processing of the third task set was performed satisfactorily, the third information indicating that the third task set was processed in accordance with the third requirements;

receive first execution metric information associated with processing the first plurality of task sets, the first execution metric information comprising, for each task of the first, second, and third plurality of tasks of the first plurality of task sets, a size of the task, an amount of data that the task processed, an amount of data that the task produced, and an amount of time that transpired during execution for the task;

train a machine learning algorithm based at least on the information and based at least on the first execution metric information, wherein the machine learning algorithm is configured to determine an order for processing a plurality of future task sets submitted by a plurality of computer systems and to allocate the plurality of future task sets to the plurality of elements of computing resources, to minimize an amount of idle time of the plurality of elements of computing resources and to maximize an amount of information indicating satisfaction with an execution of the plurality of future task sets, received from the plurality of computer systems that submitted the plurality of future task sets in response to processing the plurality of future task sets;

subsequently receive a second plurality of task sets, comprising a fourth task set, a fifth task set, and a sixth task set, the fourth task set comprising a fourth plurality of tasks and fourth requirements comprising a fourth plurality of priorities between the fourth plurality of tasks, a fourth plurality of minimum computing resource allocation amounts for processing the fourth plurality of tasks, and a fourth plurality of maximum processing times to produce output data from the fourth plurality of tasks, the fifth task set comprising a fifth plurality of tasks and fifth requirements comprising a fifth plurality of priorities between the fifth plurality of tasks, a fifth plurality of minimum computing resource allocation amounts for processing the fifth plurality of tasks, and a fifth plurality of maximum processing times to produce output data from the fifth plurality of tasks, and the sixth task set comprising a sixth plurality of tasks and sixth requirements comprising a sixth plurality of priorities between the sixth plurality of tasks, a sixth plurality of minimum computing resource allocation amounts for processing the sixth plurality of tasks, and a sixth plurality of maximum processing times to produce output data from the sixth plurality of tasks;

determine, based at least on the machine learning algorithm, allocations for the second plurality of task sets to the plurality of elements of computing resources, and a processing order for the second plurality of task sets, wherein the allocations and processing order satisfy a probabilistic measure that the fourth, fifth, and sixth task sets will be processed in accordance with the fourth, fifth, and sixth requirements, respectively; and process the second plurality of task sets according to the determined allocations and the determined processing order.

16. The computer-readable non-transient memory medium of claim 15, wherein the plurality of elements of computing resources comprise graphics processing units.

17. The computer-readable non-transient memory medium of claim 15, wherein plurality of elements of computing resources comprise field programmable gate arrays.

18. The computer-readable non-transient memory medium of claim 15, wherein the memory medium comprises at least one of an operating system, a virtual machine, and a hypervisor.

19. The computer-readable non-transient memory medium of claim 15, wherein the computer-readable non-transient memory medium further stores instructions that are executable by the one or more processors and that when executed by the one or more processors, cause the system to further:
: receive a request to process a seventh task set while the system is processing at least one of the fourth task set, the fifth task set, and the sixth task set, wherein the fourth task set is associated with a first priority, the fifth task set is associated with a second priority, the sixth task set is associated with a third priority, and the seventh task set is associated with a fourth priority that is a higher priority than the first priority, the second priority, and the third priority;
: determine that the system has finished processing the fourth task set, the fifth task set, and the sixth task set; and
: in response to determining that the system has finished processing the fourth task set, the fifth task set, and the sixth task set, process the seventh task set.

20. The computer-readable non-transient memory medium of claim 15, wherein the computer-readable non-transient memory medium further stores instructions that are executable by the one or more processors and that when executed by the one or more processors, cause the system to further:
: receive a request to process a seventh task set while the system is processing at least one of the fourth task set, the fifth task set, and the sixth task set, wherein the fourth task set is associated with a first priority, the fifth task set is associated with a second priority, the sixth task set is associated with a third priority, and the seventh task set is associated with a fourth priority that is a higher priority than the first priority, the second priority, and the third priority;

pause processing the at least one of the fourth task set, the fifth task set, and the sixth task set;

after the system pauses processing the at least one of the fourth task set, the fifth task set, and the sixth task set, process the seventh task set; and after the system processes the seventh task set, resume processing the at least one of the fourth task set, the fifth task set, and the sixth task set.

21. The computer-readable non-transient memory medium of claim 15, wherein multiple of the second plurality of tasks are interdependent and are executed in a pipeline-fashion.

* * * * *

UNITED STATES PATENT AND TRADEMARK OFFICE
CERTIFICATE OF CORRECTION

| | |
|---|---|
| PATENT NO. | : 10,572,307 B2 |
| APPLICATION NO. | : 15/660234 |
| DATED | : February 25, 2020 |
| INVENTOR(S) | : Shakti Suman et al. |

It is certified that error appears in the above-identified patent and that said Letters Patent is hereby corrected as shown below:

On the Title Page

Under item (73), under ASSIGNEE, please delete "Bank of America Corportion" and please insert -- Bank of America Corporation --, therefor.

Signed and Sealed this
Fourteenth Day of June, 2022

Katherine Kelly Vidal
*Director of the United States Patent and Trademark Office*